United States Patent [19]

Imai

[11] Patent Number: 4,787,719

[45] Date of Patent: Nov. 29, 1988

[54] ZOOM LENS SYSTEM

[75] Inventor: Toshihiro Imai, Tokyo, Japan

[73] Assignee: Olympus Optical Co., Ltd., Tokyo, Japan

[21] Appl. No.: 788,222

[22] Filed: Oct. 16, 1985

[30] Foreign Application Priority Data

Oct. 18, 1984 [JP] Japan .................. 59-217284

[51] Int. Cl.⁴ .............................................. G02B 15/14
[52] U.S. Cl. ................................................. 350/427
[58] Field of Search ......................... 350/423, 427, 428

[56] References Cited

U.S. PATENT DOCUMENTS

| 3,975,089 | 8/1976 | Betensky | 350/427 |
| 4,256,381 | 3/1981 | Kreitzer | 350/423 |
| 4,284,331 | 8/1981 | Tanaka | 350/427 |
| 4,586,793 | 5/1986 | Tanaka et al. | 350/423 |
| 4,636,040 | 1/1987 | Tokumaru | 350/427 |
| 4,712,883 | 12/1987 | Kato et al. | 350/427 |

FOREIGN PATENT DOCUMENTS

| 3305688 | 9/1983 | Fed. Rep. of Germany | 350/423 |
| 57-40220 | 3/1982 | Japan . | |
| 59-29215 | 2/1984 | Japan . | |
| 59-31922 | 2/1984 | Japan . | |
| 59-31923 | 2/1984 | Japan . | |

Primary Examiner—Charles T. Jordan
Assistant Examiner—Michael J. Carone
Attorney, Agent, or Firm—Cushman, Darby & Cushman

[57] ABSTRACT

A zoom lens system has a plurality of lens groups movable at the time of zooming and one of the lens groups comprises a plurality of lens components having a positive and a negative lens components. Focusing is done by both the variation of the relative position of respective lens components of the lens group and the movement of the lens group as a whole. This arrangement enables the zoom lens system to be made compact and the moving mechanism of the lens group simple.

6 Claims, 3 Drawing Sheets though a focus is effected for a certain object, when zooming is carried out, focus remains on the same object. Namely, according to the present invention, the amount of movement of the focusing lens group for focusing an object at a certain distance is common to the short focal length and the long focal length.

ZOOM LENS SYSTEM

BACKGROUND OF THE INVENTION (a) Field of the Invention

This invention relates to a zoom lens system, especially a zoom lens system employing a new focusing method.

(b) Description of the Prior Art

The most general focusing method of a zoom lens system is the one in which a zoom lens system has a focusing lens group which is fixed at the time of zooming, and focusing is done by having this lens group moved only at the time of focusing.

A known focusing method of this kind has a defect that the diameter of a front lens inevitably becomes large because the front lens is moved towards the object at the time of focusing.

In order to overcome the above mentioned defect, one may consider a focusing method in which focusing is done by moving at least one of lenses in the movable lens groups which is moved at the time of zooming. In this focusing method, the above mentioned lens which is moved for focusing has to be moved also at the time of zooming. Therefore, there is a defect in that the movement of the lenses becomes intricate, so that the moving mechanism for the lenses becomes complex.

As the prior art intended to overcome this defect, the zoom lens systems disclosed in Japanese published Unexamined patent application Nos. 29215/84, 31922/84 and 31923/84 are known. In the arrangement shown in each of these prior art references, only a reduction in the amount of movement of the lenses is made and the defect is not overcome completely.

SUMMARY OF THE INVENTION

It is a primary object of the present invention to provide a zoom lens system in which one of the movable lens groups is the focusing lens group and which employs a focusing method in which the amount of movement of the above mentioned focusing lens group at the time of focusing remains constant and thus is common to every situation of zooming.

The zoom lens system according to the present invention comprises a number of lens groups in which zooming is done by varying the relative positions of these groups on the optical axis. One of these movable lens groups which are moved on the optical axis comprises a number of lens components involving at least a positive lens component and a negative lens component. As a focusing lens group, this lens group is relatively moved in an amount common to every situation of zooming. Therefore, after focusing is done by the above mentioned focusing lens group for an arbitrary object point, it is possible to effect zooming through all the range of zooming by a predetermined movement of the focusing lens group together with other movable lens groups at the time of zooming.

The above mentioned focusing lens group may have two lens components comprising a positive lens component and a negative lens component, or may comprise three or more lens components added with another lens component. In the case of the configuration with three or more lens components, it will be possible to make a zooming ratio larger and to improve the ability of correction of aberration. It has been made possible to decrease the amount of movement of the lenses at the time of focusing because the focusing lens group comprises a positive lens component and a negative lens component.

The focusing method mentioned above can be also applicable to macro zooming. That is, in the macro zooming, it is possible that zooming is done by varying the airspace between respective lens groups of a number of lens groups as is the case mentioned above, and because one of the movable lens groups which are moved at the time of zooming comprises a number of lens components as a focusing lens group, focusing is done by both the movement of the whole of this focusing lens group and the variation of the airspace among lens components constituting this lens group.

When focusing is necessary for an object which is out of a range capable of being focused by the above mentioned focusing method, focusing is possible when one or more of the movable lens groups is caused to assume a movement different from the movement assumed at the time of zooming. As the simplest method of this kind, it may be considered that focusing may be done by the movement of the whole of the lens groups as a unit.

DETAILED DESCRIPTION OF THE PREFERRED EMBODIMENTS

Figure 1:
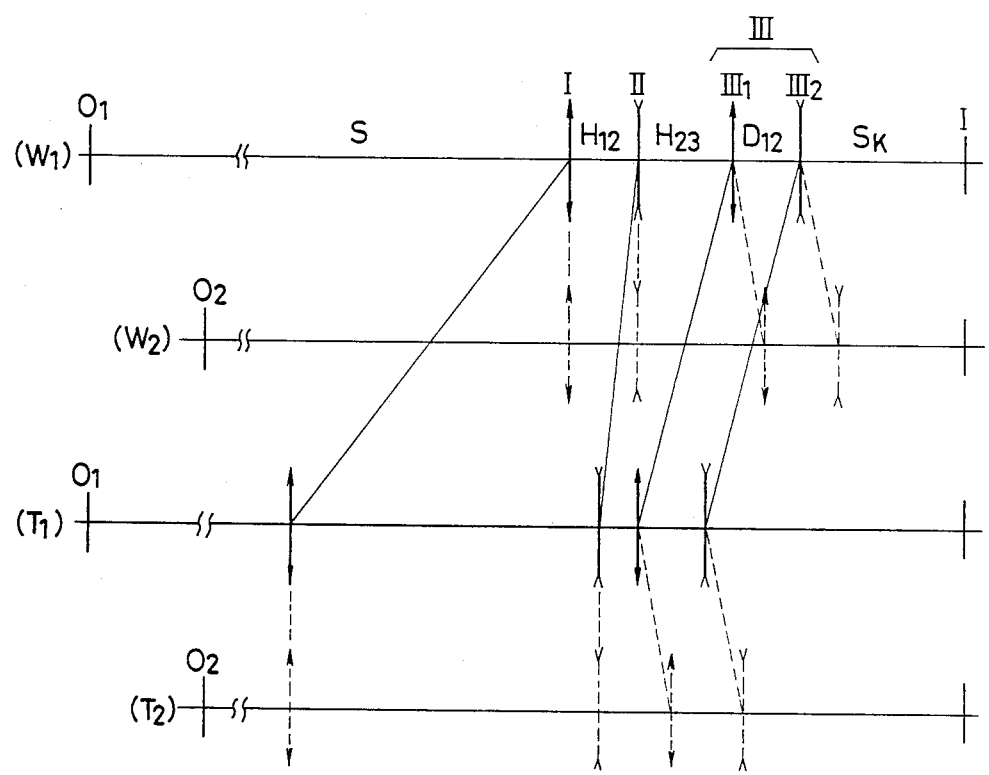
FIGS. 1 through 3 respectively show the diagrammatical views of the configurations and the moving situations of the lens groups at the time of focusing and zooming on Embodiments 1 through 3 according to the present invention.

FIG. 1 shows the diagrammatical view of the configuration and the moving situation of the lens group on Embodiment 1 according to the present invention.

In this Embodiment 1, a zoom lens system comprises a first lens group I having a positive refracting power, a second lens group II having a negative refracting power, a third lens group III comprising a positive lens component $III_1$ and a negative lens component $III_2$. Zooming and focusing are done by the movement of the lens groups as shown in this Figure.

In FIG. 1, ($W_1$) represents the situation where focusing is done for a first object point $O_1$ at a short focal length, ($T_1$) represents the situation where focusing is done for the first object point $O_1$ at a long focal length, ($W_2$) represents the situation where focusing is done for a second object point $O_2$ at the short focal length, ($T_2$) represents the situation where focusing is done for the second object point $O_2$ at the long focal length.

As shown in this Figure, when zooming is done from the short focal length to the long focal length within the situation that focusing is done for the first object $O_1$, the situation changes from ($W_1$) to ($T_1$). In this case, the airspace between the lens component $III_1$ and the lens component $III_2$ of the third lens group III is not varied.

When focusing is done for the second object $O_2$ from the first object $O_1$ at the short focal length, the situation changes from ($W_1$) to ($W_2$). In this case, the airspace between the first lens group I and the second lens group II is not varied.

Changes from one situation to another can be effected in the same manner.

The numerical data of this Embodiment 1 are as follows:

$f_1 = 173.1$
$f_2 = -51.42$
$f_{31} = 32.84$
$f_{32} = -50.26$ when I O=603.5

|     | $S_1$ | $H_{12}$ | $H_{23}$ | $D_{12}$ | $S_K$ |
| --- | --- | --- | --- | --- | --- |
| (W) | 468.1 | 23.54 | 32.47 | 23.09 | 56.2 |
| (S) | 409.5 | 79.99 | 20.90 | 23.09 | 70.3 |
| (T) | 372.4 | 105.81 | 14.04 | 23.09 | 88.0 | when I O=453.5

|     | $S_1$ | $H_{12}$ | $H_{23}$ | $D_{12}$ | $S_K$ |
| --- | --- | --- | --- | --- | --- |
| (W) | 318.1 | 23.54 | 44.32 | 24.85 | 42.6 |
| (S) | 259.5 | 79.99 | 32.75 | 24.85 | 56.3 |
| (T) | 221.5 | 105.81 | 25.89 | 24.85 | 75.5 | where $f_1$, $f_2$, $f_{31}$ and $f_{32}$ respectively represent the focal lengths of the first lens group I, the second lens group II, the first lens component $III_1$ of the third lens group III and the second lens component $III_2$ thereof, $S_1$ represents the distance to the object, $H_{12}$, $H_{23}$ respectively represent the airspace between the first lens group I and the second lens group II and that between the second lens group II and the third lens group III, $D_{12}$ represents the airspace between the first lens component $III_1$ of the third lens group III and the second lens component $III_2$ thereof, $S_K$ represents the distance to the image, I O represents the distance between the object and the image, and (W), (S) and (T) respectively represent the situation at the short focal length, that at the medium focal length and that at long focal length.

Figure 2:
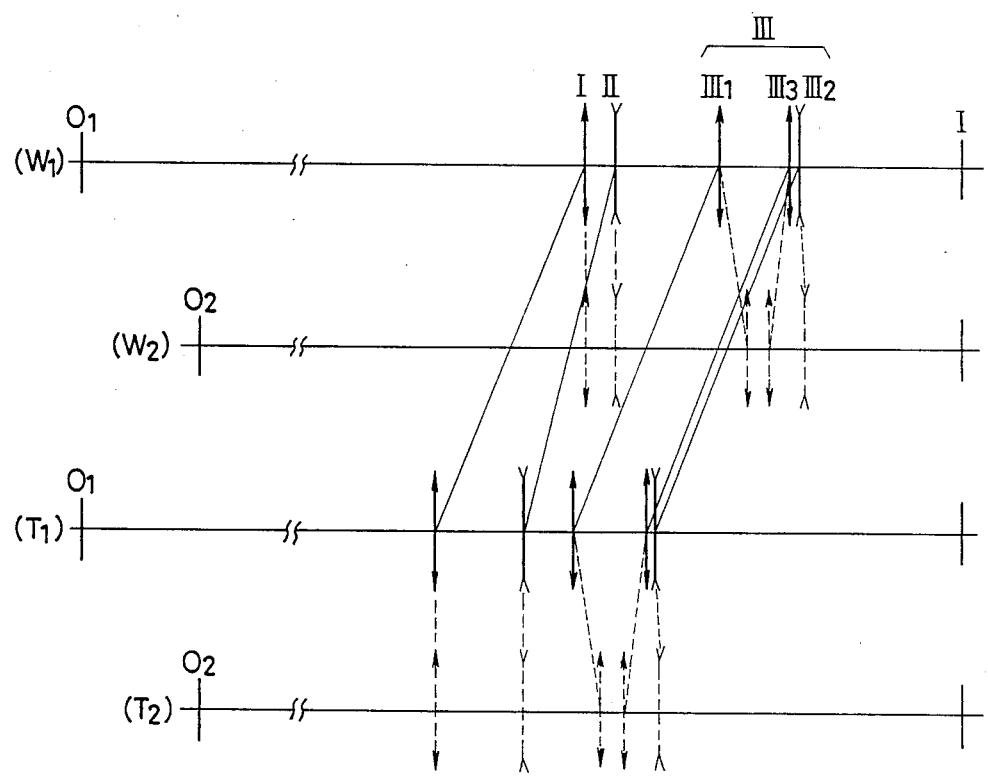

FIG. 2 shows a diagrammatical view of Embodiment 2 according to the present invention. In this Embodiment, the focusing lens group is the third lens group III. This third lens group III comprises a positive lens component $III_1$, a positive lens component $III_3$ and a negative lens component $III_2$. Also in this Figure, ($W_1$), ($W_2$) respectively represent the situations where focusing is done for the object $O_1$, $O_2$ at the short focal length, and ($T_1$), ($T_2$) respectively represent the situations where focusing is done for the object $O_1$, $O_2$ at the long focal length.

The numerical data of this Embodiment 2 are as follows:

$f_1 = 96.35$
$f_2 = -28.65$
$f_{31} = 36.48$
$f_{32} = -80.36$
$f_{33} = 133.67$
when I O=645

|     | $S_1$ | $H_{12}$ | $H_{23}$ | $D_{12}$ | $D_{23}$ | $S_K$ |
| --- | --- | --- | --- | --- | --- | --- |
| (W) | 517.6 | 9.83 | 35.52 | 27.11 | −2.61 | 57.8 |
| (S) | 506.7 | 19.60 | 30.56 | 27.11 | −2.61 | 63.9 |
| (T) | 466.9 | 29.66 | 16.75 | 27.11 | −2.61 | 107.5 | when I O=365

|     | $S_1$ | $H_{12}$ | $H_{23}$ | $D_{12}$ | $D_{23}$ | $S_K$ |
| --- | --- | --- | --- | --- | --- | --- |
| (W) | 237.6 | 9.83 | 44.40 | 19.29 | −12.03 | 66.2 |
| (S) | 226.7 | 19.60 | 39.45 | 19.29 | −12.03 | 72.3 |
| (T) | 186.9 | 29.66 | 25.64 | 19.29 | −12.03 | 115.8 | where $f_{33}$ represents the focal length of the positive lens component $III_3$ at the image side of the third lens group III, $D_{12}$, $D_{23}$ respectively represent the airspace between the positive lens component $III_1$ at the object side of the third lens group III and the negative lens component $III_2$ thereof and that between the negative lens component $III_2$ thereof and the positive lens component $III_3$ at the image side thereof. The airspace is positive if measured for the direction of ray passing and is negative if measured against that direction. Other reference symbols are the same as those in Embodiment 1.

Figure 3:
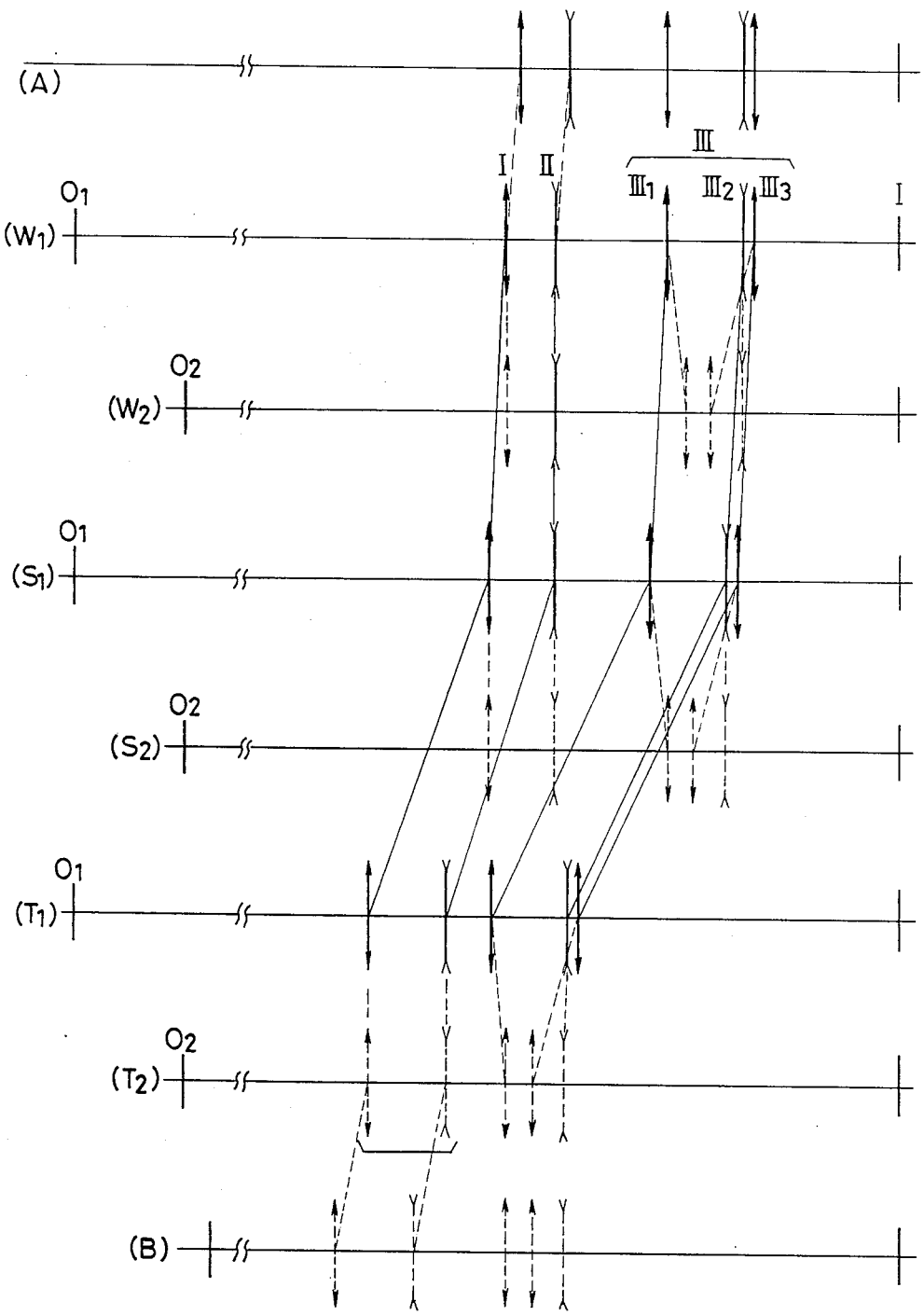

FIG. 3 shows a diagrammatical view of Embodiment 3 according to the present invention, where the focusing method provided by the zoom lens system according to the present invention is applied to a macro zoom lens system. Also in this Embodiment 3, a third lens group III is a focusing lens group, which comprises a positive lens component $III_1$, a negative lens component $III_2$ and a positive lens component $III_3$. In this Figure, ($W_1$), ($W_2$) respectively represent the situation where focusing is done for the object $O_1$, $O_2$ at the short focal length, ($S_1$), ($S_2$) respectively represent the situation where focusing is done for the object $O_1$, $O_2$ at the medium focal length, and ($T_1$), ($T_2$) respectively represent the situation where focusing is done for the object $O_1$, $O_2$ at the long focal length.

In this Embodiment 3, focusing is done for an infinite distant object by having the first lens group I and the second lens group III moved as a unit as shown in (A) of FIG. 3, and focusing is done for the short distant object as shown in (B) thereof.

The numerical data of this Embodiment 3 are as follows:

$f_1 = 108.65$
$f_2 = -31.40$
$f_{31} = 39.53$
$f_{32} = -130.98$
$f_{33} = 224.70$
when I O=664.3

|     | $S_1$ | $H_{12}$ | $H_{23}$ | $D_{12}$ | $D_{23}$ | $S_K$ |
| --- | --- | --- | --- | --- | --- | --- |
| (W) | 520 | 18.46 | 41.43 | 28.29 | 4.21 | 51.8 |
| (S) | 514 | 24.20 | 36.72 | 28.29 | 4.21 | 56.8 |
| (T) | 470 | 27.67 | 17.12 | 28.29 | 4.21 | 116.9 | when I O=385.5

|     | $S_1$ | $H_{12}$ | $H_{23}$ | $D_{12}$ | $D_{23}$ | $S_K$ |
| --- | --- | --- | --- | --- | --- | --- |
| (W) | 241 | 18.46 | 48.47 | 20.80 | −11.63 | 68.1 |
| (S) | 235 | 24.20 | 43.77 | 20.80 | −11.63 | 73.0 |
| (T) | 191 | 27.67 | 24.16 | 20.80 | −11.63 | 133.2 |

Also in the above mentioned data, the airspace is positive if meassured in the direction in which a ray passes and negative if meassured against the direction thereof. In every Embodiment the value of the airspace is that between the principal points. Therefore, in Embodiment 3, the position of the negative lens component $III_2$ of the third lens group III and the position of the positive lens component $III_3$ thereof are reversed, which means the reversal of the principal points of both the lens components, and does not mean the reversal of the position of both the lens components themselves.

In this Embodiment, the magnification in each situation is as follows:

| ($W_1$) | −0.1 | ($W_2$) | −0.169 |
| --- | --- | --- | --- |
| ($S_1$) | −0.12 | ($S_2$) | −0.2 |

| -continued | | | |
|---|---|---|---|
| (T₁) | −0.3 | (T₂) | −0.55 |

In this Embodiment, focusing can be done for the infinite distant object by setting $H_{23}$ 35.92 in the situation ($W_1$), and for the object to which the distance S is 48.9 (the object with the magnification −1.0) by setting $H_{23}$ 35.95 in the situation ($T_2$).

In the zoom lens system according to the present invention, because the first lens group I may not be fixed but be used as the zooming lens group, it is possible to reduce the number of the lens groups constituting the lens system. Also, because it is not necessary to use the first lens group I, which is arranged away from a diaphragm, as a focusing lens group, it is possible to reduce the diameter of the front lens while maintaining the illumination of the peripheral portion in the image field. Further, because the operations of both the zooming and the focusing can be done by the mixing of zooming and focusing cams, it is possible to make the cam and frame mechanisms simple.

In the zoom lens system according to the present invention, it is possible to apply the focusing method to a macro lens system, and to obtain the compact macro zoom lens system while maintaining the variable power ratio of 3 and the range of the distance I O between the object point and the image point wide. Moreover, it is possible to focus for the infinite distant object and the very short distant object without the variation of the magnification. In this case, it is natural to focus for the long distant object in the situation where the magnification is the lowest in a range of the macro zooming and to focus for the short distant object in the situation where the magnification is the highest therein.

I claim:

1. A zoom lens system comprising a plurality of lens groups disposed along an optical axis, one of which is located on the most object side of such axis and is movable along said optical axis at the time of zooming, another of said lens groups, arranged at another position on said axis and comprising a positive lens component and a negative lens component, whereby focusing is done by moving said another lens group along said optical axis at the same time changing the relative distance between said positive lens component and said negative lens component, and the moving amounts of said another lens group and said positive and negative lens components is constant for any value of focal length of the lens system as a whole, wherein one of said lens groups, except said another lens group for focusing, is movable along said optical axis so that focusing for objects positioned in a range is done, except the range for which focusing can be done by moving said another lens group.

2. A zoom lens system according to claim 1, wherein said one lens group has positive refractive power, and said another lens group has positive refractive power and a third lens group is provided located between said one lens group and said another lens group, said third lens group having negative refractive power.

3. A zoom lens system according to claim 1, wherein said one lens group has positive refractive power, and said another lens group has positive refractive power and a third lens group is provided located between said one lens group and said another lens group, said third lens group having negative refractive power.

4. The zoom lens system is claimed in claim 3, wherein said one lens group and said another lens group move in a body along said optical axis without varying the relative distance therebetween so that focusing for objects positioned in a range outside the range for which focusing is accomplished by moving said another lens group can be effected.

5. A zoom lens system according to claim 1 wherein said another lens group for focusing further comprises another positive lens component, said another positive lens component, said positive lens component and said negative lens component being arranged in the order from the object side in said another lens group, and the relative distances among said three lens components being varied when said another lens group for focusing moves along the optical axis.

6. A zoom lens system according to claim 1 wherein said another lens group for focusing further comprises another positive lens component, said another positive lens component, said negative lens component and said positive lens component being arranged in the order from the object side in said another lens group, and the relative distances among said three lens components being varied when said another lens group for focusing moves along the optical axis.

* * * * *